United States Patent [19]
Gould

[11] Patent Number: 5,596,166
[45] Date of Patent: Jan. 21, 1997

[54] PENETRATING VEHICLE WITH ROCKET MOTOR

[75] Inventor: Robert L. Gould, Westlake Village, Calif.

[73] Assignee: Logicon RDA, Los Angeles, Calif.

[21] Appl. No.: 365,028

[22] Filed: Dec. 28, 1994

[51] Int. Cl.⁶ .................................................. F42B 15/00
[52] U.S. Cl. ...................... 102/362; 102/374; 102/380; 102/284
[58] Field of Search .................... 102/362, 374, 102/380, 284, 398, 308, 481

[56] References Cited

U.S. PATENT DOCUMENTS

| | | | |
|---|---|---|---|
| 1,276,706 | 8/1918 | Aydelotte | 102/362 |
| 3,002,453 | 10/1961 | Fedor et al. | 102/398 |
| 3,319,566 | 5/1967 | Choate et al. | 102/380 |
| 3,401,634 | 9/1968 | Martin et al. | 102/374 |
| 3,547,031 | 12/1970 | Black et al. | 102/380 |
| 3,750,979 | 8/1973 | Nelms . | |
| 3,863,573 | 2/1975 | Dilchert | 102/284 |
| 3,897,730 | 8/1975 | Riparbelli . | |
| 3,935,817 | 2/1976 | Riparbelli . | |
| 4,013,743 | 3/1977 | Blasche, Jr. et al. | 102/284 |
| 4,063,512 | 12/1977 | Davis | 102/380 |
| 4,488,487 | 12/1984 | Croizer . | |
| 4,637,313 | 1/1987 | Henderson . | |
| 4,876,963 | 10/1989 | Deffayet . | |
| 5,001,982 | 3/1991 | Schricker | 102/380 |
| 5,109,774 | 5/1992 | Deffayet . | |
| 5,166,468 | 11/1992 | Atkeson | 102/207 |
| 5,206,456 | 3/1993 | Pracchia et al. | 102/207 |
| 5,361,703 | 11/1994 | Braithwaite | 102/481 |
| 5,440,993 | 8/1995 | Osofsky | 102/374 |

OTHER PUBLICATIONS

BLU–109 and BLU–113 by Battelle Corp. Reference No. LMSC–F433813, 4 Dec. 1991.

*Primary Examiner*—Michael J. Carone
*Assistant Examiner*—Christopher K. Montgomery
*Attorney, Agent, or Firm*—Poms, Smith, Lande & Rose

[57] ABSTRACT

A penetrating vehicle having a rocket motor includes an elongated projectile body with a forward section for holding a payload and a rearward section for housing the rocket motor. The vehicle contains a fuse that ignites the propellant of the rocket motor during impact of the projectile body with a surface barrier. The propellant provides high thrust in a rapid burn time and thereby counteracts undesirable deceleration forces acting on the body during impact. The high thrust also promotes a maximum penetration of the projectile body within the surface barrier.

8 Claims, 5 Drawing Sheets

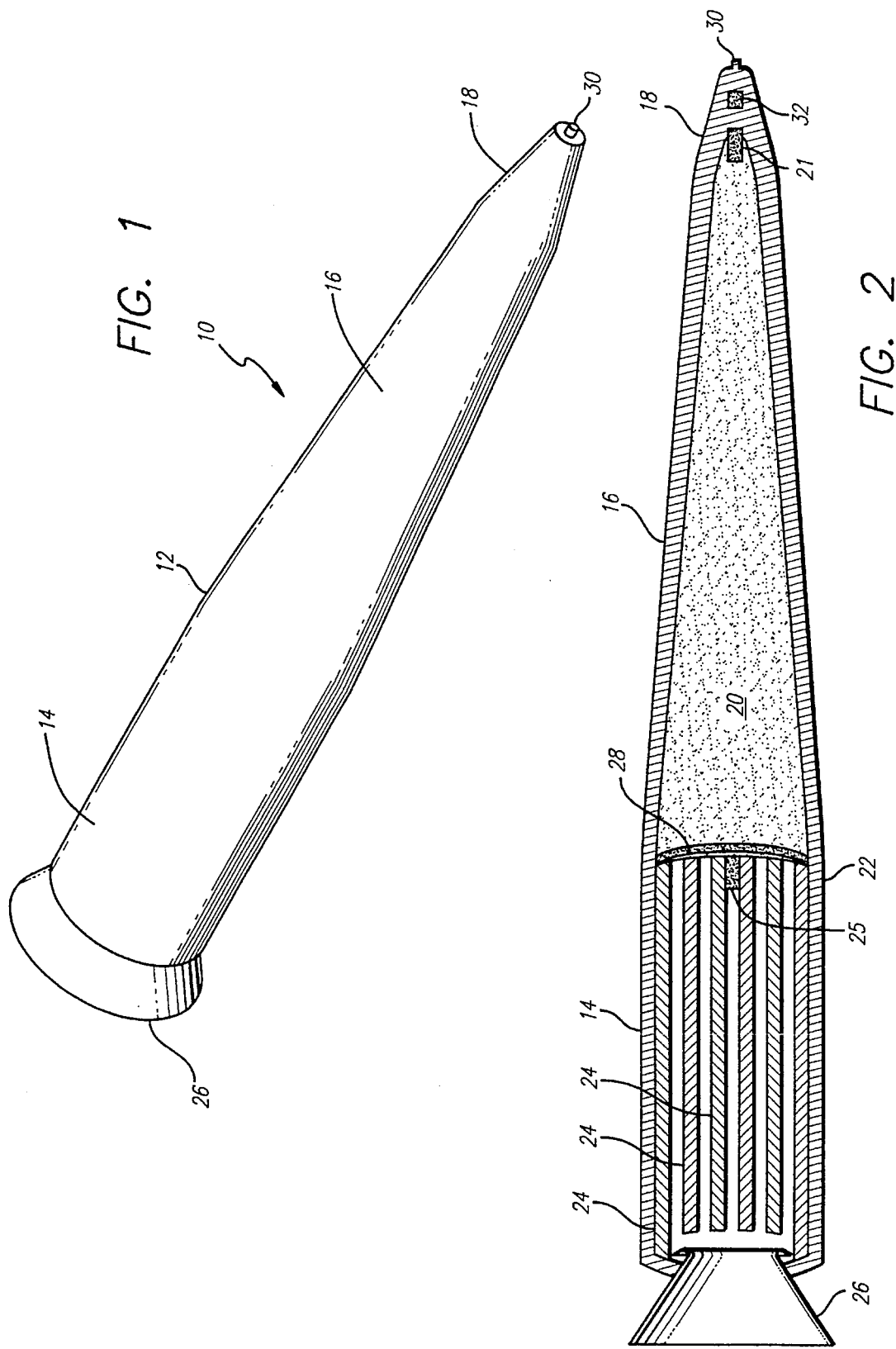

PENETRATING VEHICLE WITH ROCKET MOTOR

Field of the Invention

The present invention relates to vehicles for penetrating surface barriers and particularly to vehicles that penetrate surface barriers with the aid of a propelling thrust.

BACKGROUND OF THE INVENTION

To achieve tactical and strategic goals during military, para-military or police actions and conflicts, the destruction, or at least impairment, of targets encased within surface barriers (i.e., "hardened" targets) is often required. Since such surface barriers typically take the form of underground concrete walls or layers of soil, sand or rock, successful elimination of hardened targets often proves problematic.

Conventional bombs and rockets are largely ineffective against hardened targets. For example a conventional rocket fired from a land based location to impact on a remote target does not have the structural rigidity or the directed kinetic energy that is specifically intended to destroy hardened targets. The shape and structure of such a weapon cannot usually withstand the severe structural loads necessary to penetrate a hardened target. Nor does such a weapon include a mechanism to direct and control its kinetic energy for suitable impact to penetrate the hardened target; the needed kinetic energy from the rocket's initial firing is either too great for the rocket to survive impact or has been exhausted prior to the rocket reaching the desired destination. Moreover, the explosives in such a conventional weapon are usually set to detonate immediately upon impact which results in essentially an arbitrary release of destructive energy which is incapable of penetrating the surface barrier. As a result, various types of devices have been designed for the specific purpose of penetrating the surface barriers of such hardened targets so that the target may be exposed and eliminated. Such weapons are sometimes referred to as kinetic energy penetrating vehicles.

The existing types of kinetic energy penetrating vehicles may be broken down essentially into two groups, unthrusted and thrusted (although the particular designs within each group vary widely). Unthrusted kinetic energy penetrating vehicles reach an impact velocity due solely to the forces of gravity acting on the vehicle during descent towards the intended target. The shape and structural rigidity of the vehicle (usually a hardened stainless steel conical or cylindrical shape) combined with the kinetic energy gained from the gravitational forces promote penetration of the surface barrier of the hardened target upon impact by the vehicle. The devices then detonate an explosive payload to destroy the target. Such devices are not particularly sophisticated and therefore offer economic advantages in fabrication and production. Examples of unthrusted kinetic energy penetrating vehicles include the bombs identified as the BLU-109 and the BLU-113 by Battelle Corp and the bomb described in U.S. Pat. No. 4,488,487 to Croizer.

Thrusted vehicles on the other hand incorporate a thrusting device, usually a rocket motor, which, during descent, accelerates the vehicle to an impact velocity greater than would otherwise be achieved by gravitational forces. The increased velocity provides greater kinetic energy, which again, in combination with the shape and structural rigidity of the vehicle, enhances penetration of the surface barrier of the hardened target upon impact of the vehicle. The explosive payload therefore has a higher probability of destroying the target. Such bombs, however, must utilize materials of sufficient strength and design to withstand the added impact forces and therefore prove costly to produce. Examples of known thrusted kinetic energy penetrating bombs include the vehicles disclosed in U.S. Pat. No. 3,897,730 to Riparbelli, U.S. Pat. No. 3,935,817 to Riparbelli and U.S. Pat. No. 4,876,963 to Deffayet and the bomb disclosed in the Boosted Penetrator Study by Lockheed Missiles and Space Company, Inc. (Reference No. LMSC-F433813, 4 Dec. 1991).

Despite the proliferation of both unthrusted and thrusted kinetic energy penetrating vehicles, restraints on effectiveness persist. For example, when a target has been particularly well-reinforced (e.g., a target encased in thick steel-reinforced concrete), an unthrusted kinetic energy penetrating vehicle is often incapable of successfully penetrating the barrier. Due to the low velocity, the vehicle does not have sufficient kinetic energy to penetrate the particularly strong material.

On the other hand, a thrusted kinetic energy penetrating vehicle can be imparted with too much kinetic energy and instead of penetrating the hardened barrier upon impact, the vehicle simply disintegrates. In other words, although the thrusting device is capable of imparting sufficient kinetic energy to effectuate penetration, that level of kinetic energy exceeds the structural limitations of the vehicle.

At least one kinetic energy penetrating vehicle has been proposed that would combine certain facets of thrusted and unthrusted vehicles. In U.S. Pat. No. 5,109,774 to Deffayet, a bomb is disclosed that is unthrusted during its descent and impact with the earth but becomes thrusted after the bomb has nearly come to rest. The thrust provided after impact is provided to ensure further penetration of the device into the ground. This bomb, however, incorporates structure specifically intended to preclude excessive penetration. In addition the thrusting device only provides a limited initial impulse to the penetrating vehicle. Therefore, this device does not contemplate the need to penetrate imbedded targets let alone hardened targets. It therefore fails to solve the limitations associated with thrusted and unthrusted penetrators when considering the need to destroy hardened targets protected by surface barriers.

SUMMARY OF THE INVENTION

It is therefore an object of the present invention to solve the problems of the prior art as noted above.

It is therefore an object of the present invention to provide a penetrating vehicle that combines the advantages of unthrusted and thrusted penetrating vehicles and effectively penetrates hardened targets.

It is a further object of the present invention to provide a penetrating vehicle that overcomes the limitations of thrusted and unthrusted penetrating vehicles in penetrating well-hardened targets.

It is a further object of the present invention to provide a penetrating vehicle that is economical to manufacture.

It is a further object of the present invention to provide a penetrating vehicle that provides greater penetration into surface barriers than previous penetrating vehicles.

The above objects and other objects not specifically enumerated above are sought to be achieved by a penetrating vehicle in accordance with the present invention, preferred embodiments of which are disclosed below. The disclosed penetrating vehicle contemplates an elongated projectile body having a forward section and rearward section wherein the forward section and rearward section are permanently connected to each other. The forward section includes a nose portion in the shape of a truncated cone and a compartment for housing a projectile payload. The rearward section includes a rocket motor which causes the projectile body to penetrate and traverse a surface barrier following initial contact of the projectile body with the barrier. The rocket motor is secured within the rearward section so as to travel with the projectile body during the penetration. The rocket motor includes a high energy propellent positioned within the rocket motor for a short burn time. An impact fuse is disposed in the forward section for igniting the rocket motor within a minimal lapse time after impact of the projectile body with the barrier surface. Finally, the forward section includes a wall for separating the payload compartment from the rocket motor in the rearward section.

In further aspects of the invention, the thrust contemplated for a 2,000 lbs. projectile will be at least 250,000 lbs. and the burn time will be no longer than 0.5 seconds.

Yet further aspects include positioning the rocket motor propellent in concentric circles or in a spiral configuration so as to maximize the surface area of the propellent and thereby minimize the burn time of the rocket motor.

It is also contemplated that the forward section of the projectile body follow a conical shape and the rearward section follow a cylindrical shape and that a smooth transition exist therebetween. The structural material may be high strength steel.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

Preferred embodiments of the present invention are disclosed below with reference to the following drawing figures, wherein like reference numbers correspond to like items and wherein:

FIG. 1 is a perspective view of a first preferred embodiment of a penetrating vehicle in accordance with the present invention;

FIG. 2 is a cross-sectional view of the penetrating vehicle of FIG. 1;

DETAILED DESCRIPTION OF THE PREFERRED EMBODIMENTS

Figure 3D:
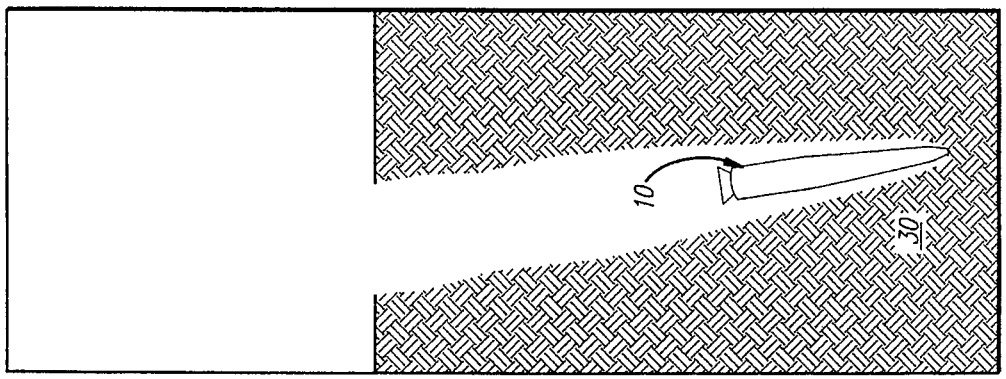
FIGS. 3A–3D are schematic views of a penetrating vehicle in accordance with the present invention during operation.

With reference to FIGS. 1 and 2, a penetrating vehicle in accordance with the present invention includes an elongated projectile body 10 having a forward section 16 and a rearward section 14. The forward section 16 has a conical shape and the rearward section 14 has a cylindrical shape. Other shapes may be desired according to design goals and mission parameters thus the shapes described with regard to the preferred embodiment are exemplary only.

Included within the forward section 16 of the elongated projectile body is a compartment 20 for receiving the vehicle payload. In most applications, the payload will comprise explosives and a detonator 21 so that the penetrating vehicle serves the function of a penetrating bomb.

The forward section 16 also includes a nose portion 18 which incorporates a conical shape that is steeper in angle than the adjacent portion of forward section 16. The steeper conical shape of the nose portion 18 enhances initial penetration at the moment the vehicle impacts a surface barrier.

The shape of the nose portion 18 is not a complete conic, however. Instead of culminating in a sharp conical point, the nose portion 18 is truncated to include a flat surface from which a round nodule 30 protrudes. The nodule 30 serves as a deterrent to a tendency of the vehicle 10 to ricochet off the surface barrier if the vehicle 10 hits the barrier at a trajectory angle other than 90° to the surface of the barrier.

Housed within the rearward section 14 of the elongated projectile body is a rocket motor 22 for providing thrust to the body at the instant of impact. The rocket motor 22 includes propellent 24 extending along substantially the length of the motor from a wall 28 separating the rocket motor from the payload compartment 20. Positioned near the wall 28 is an ignitor 25 which is connected to a fuse 32. A nozzle 26 is affixed to the rear of the rocket motor 22 to direct the thrust during combustion of the propellant. If desired, the rocket motor nozzle may be gimballed to provide control to the projectile body during penetration.

To effectuate many of the advantages of the described projectile body, the rocket motor is designed to provide a high thrust with a short burn time. A rocket motor so configured promotes penetration of the barrier while counteracting the otherwise severe peak deceleration forces that would be imparted to the projectile body at impact. The high thrust enables the projectile to penetrate a barrier to a greater distance than would have been achieved by an unthrusted body and the short burn time ensures that the high thrust is imparted to the projectile before a time lapse that would allow impact forces to harm the body or detrimentally effect penetration by the body. In this manner, the projectile body of the present invention combines the advantages of conventional thrusted and unthrusted penetrating vehicles yet avoids the limitations of such conventional penetrators on particularly hardened targets.

In order to achieve the high thrust and short burn time desired, a suitable high energy propellant is positioned within the rocket motor in a manner to effectuate maximum surface area exposure of the propellent. Referring to FIG. 2, one method of maximizing the surface area is to arrange the propellant 24 in a spiral configuration that extend substantially the length of the rocket motor. An alternative is to arrange the propellent in concentric circles.

For a projectile body weighing around 2000 lbs, high thrust would range anywhere from 250,000 lbs to 2,000,000 lbs and a short burn time would range from 0.04 seconds to 0.5 seconds. Other ranges may apply given differing structural parameters of the projectile body (e.g., weight in diameter) and the severity of the mission goals. Therefore, the ranges provided are only exemplary and should not be construed as limiting the scope of the invention.

The chamber pressure within the rocket motor should be relatively high, i.e., greater than 4,000 psi and preferably greater than 6,000 psi. In one representative design, the projectile body had a diameter of approximately six inches and the design chamber pressure was on the order of 7,000 psi. The design wall thickness was set at approximately 0.33 inches of steel, preferably high strength steel. It is possible that a somewhat thinner wall is possible, on the order of 0.17 inches, but the greater thickness is desirable to ensure proper containment of the pressure. With increased diameters of the projectile body, the wall thickness should be increased substantially proportionally. For example, increasing the diameter of the body from six inches to eighteen inches should result in an increase in wall thickness from 0.33 inches to around 1 inch, although it is possible that a 0.5 inch thick wall would suffice. A general rule of thumb is that the ratio of wall thickness to the projectile diameter should be no less than 1 to 36.

The rocket motor is ignited at impact by its ignitor 25 which, in turn, is activated by a contact fuse 32 disposed within the nose portion 18 of the projectile body. Other fuses may be considered, including a stand-off fuse that senses the impending impact and initiates ignition accordingly. The fuse ignites the propellent and a high thrust is achieved in about a millisecond.

The fuse 32 will also function to detonate the explosives through the detonator 21. In some applications, it will be desirable to utilize a Hard Target Smart Fuze (HTSF) which is a fuse that is more sophisticated than conventional fuses. Such an HTSF includes a sensor that measures the resistance encountered by a bomb when it hits a target and can recognize what material it is penetrating. It can distinguish between walls and rooms and reinforced barriers. Therefore, it can delay activating the detonator and detonating the explosives until the vehicle has traversed through the proper number of walls or the proper number of floors, etc. and has reached the desired target.

The elongated projectile body 10 may be formed from any sufficiently strong material. Presently, the most suitable material is high-strength steel. It may be contemplated, however, to form the forward section of the body 10 of steel and form the rearward section of a lightweight material, even perhaps composite materials. Mission parameters, however, will dictate the acceptability of alternative materials.

Figure 3C:
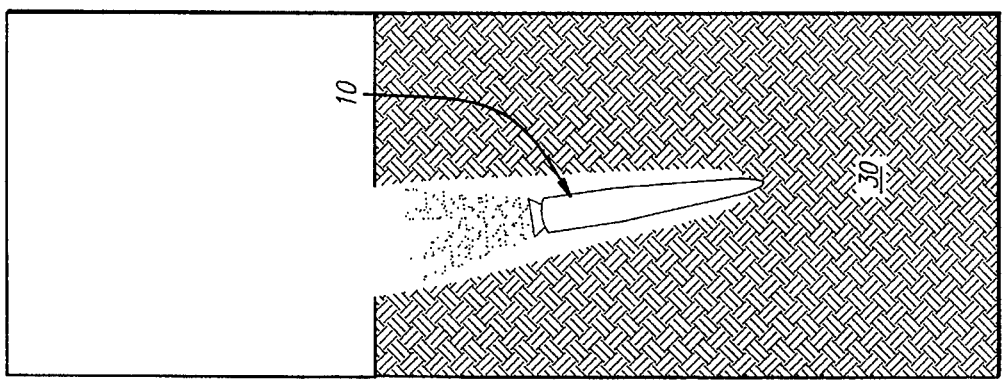
Figure 3B:
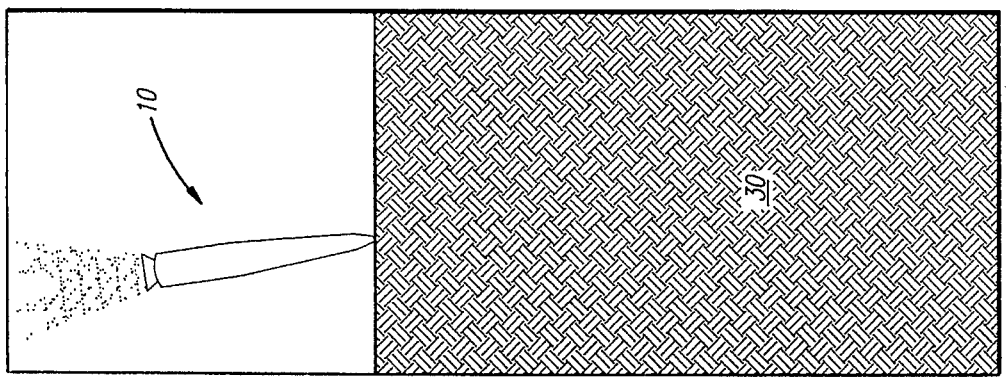
Figure 3A:
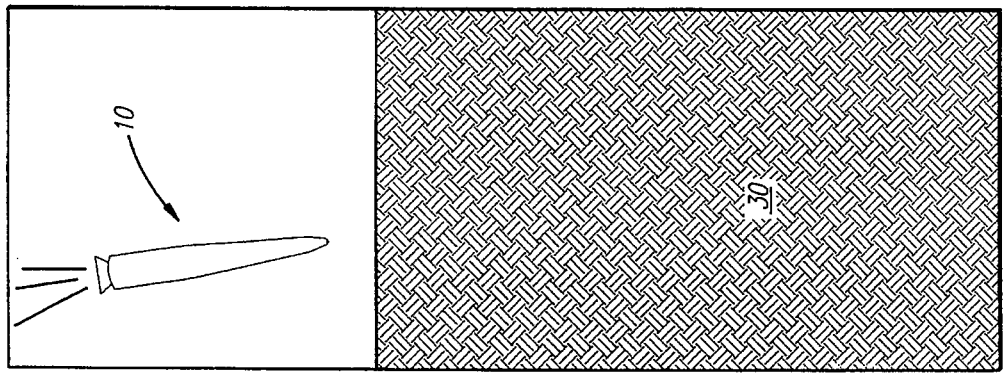

The operation of a kinetic energy penetrating vehicle in accordance with the present invention is depicted schematically in FIGS. 3A–3D. Referring first to FIG. 3A, the projectile body 10 is released from its carrier, usually an aircraft, and allowed to descend towards the desired target surface or barrier 30. The projectile body 10 is unguided and unthrusted at this time and achieves its flight attitude and velocity from the forces of gravity and the surfaces of the projectile body 10. In particular circumstances, the projectile body 10 may be fitted with guidance and propellant apparatus (not shown) for use in attacking targets requiring more precise aiming and more kinetic energy for penetration and destruction.

Referring to FIG. 3B, at the instant the projectile body contacts the barrier 30, the rocket motor 22 is ignited by the contact fuse 32. The high thrust and short burn time from the rocket motor 22 thereby urges penetration of the projectile body 10 while counteracting the deceleration peak that otherwise would be encountered at impact.

Referring to FIG. 3C, continued combustion of the propellent 24 in the rocket motor 22 causes the projectile body to further penetrate the barrier 30 until the propellant 24 is exhausted. After the propellant is exhausted, the projectile body finally comes to rest, as depicted in FIG. 3D, deeply imbedded within the barrier 30. In this manner, penetration of the target has been maximized without undue damage to the projectile body thus allowing detonation of the payload to further expose and destroy the target.

Figure 4A:
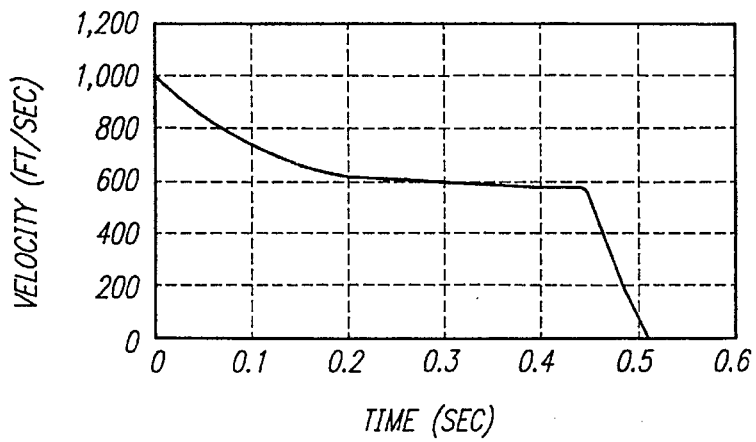
FIGS. 4A–4C are graphs depicting trajectory data for soil penetration of a penetrating vehicle in accordance with the present invention; and, FIGS. 5A–5C are graphs depicting trajectory data for concrete penetration of a penetrating vehicle in accordance with the present invention.
Figure 4B:
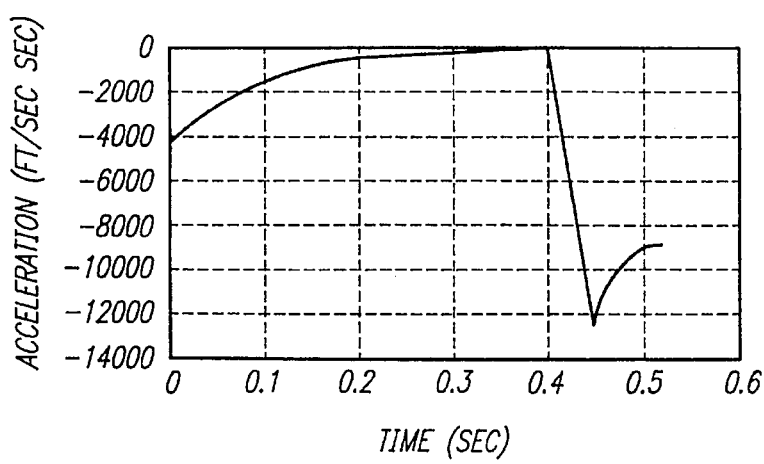
Figure 4C:
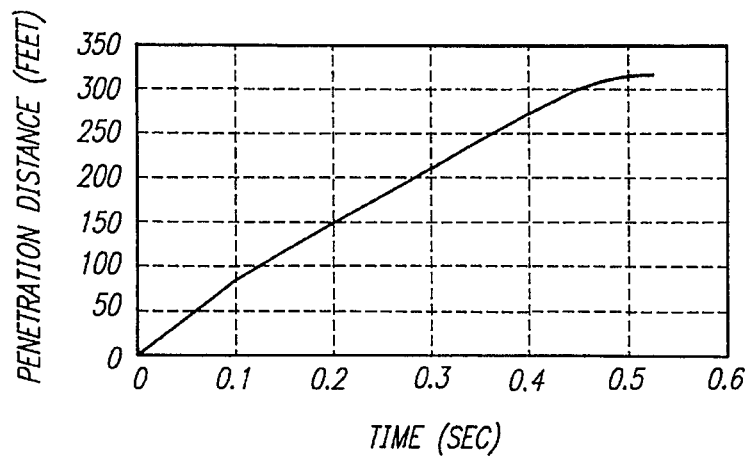
Figure 5A:
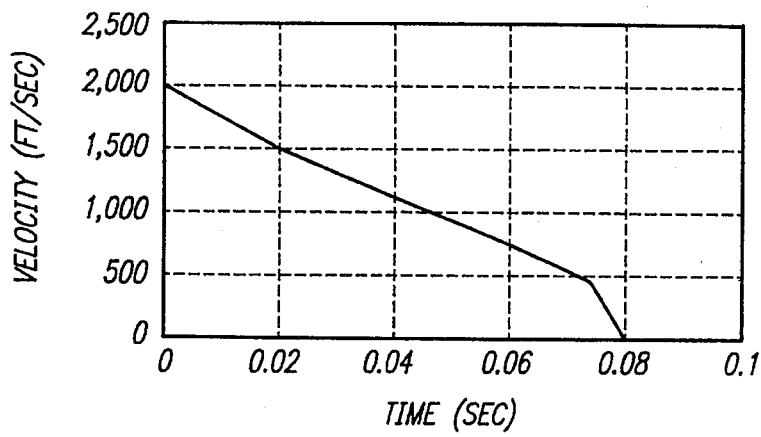
Figure 5B:
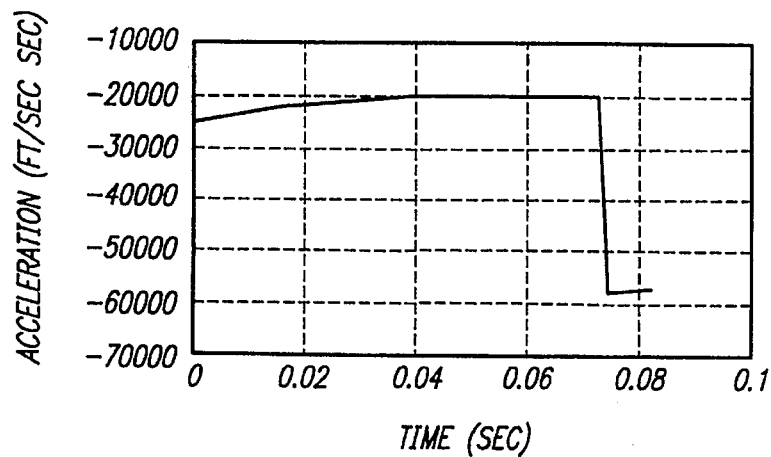
Figure 5C:
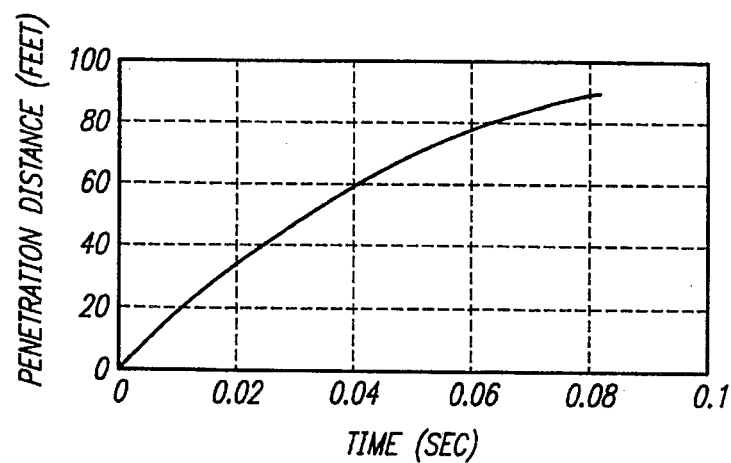

Theoretical calculations have been performed that verify the present invention and are provided here with reference to FIGS. 4A–4C and FIGS. 5A–5C. The graphs represent the velocity, acceleration and penetration distance, respectively, of the penetrating body 10 over time starting at the instant of impact. The graphs of FIGS. 4A–4C represent data for a penetrating body 10 as it penetrates a soil barrier. The graphs of FIGS. 5A–5C represent data for a penetrating body 10 as it penetrates a concrete barrier.

The graphs of FIGS. 4A–4C represent data for a penetrator body 10 having a total weight of 2000 lbs., 1000 lbs. of which are due to the weight of the rocket motor 22. The thrust provided by the rocket motor was 450,000 lbs. and the impact velocity was 1000 ft/sec, a velocity normally achieved from a free-fall (i.e., unthrusted) descent. Burn time lasted between 0.4 and 0.5 seconds.

The velocity graph, FIG. 4A, shows that the thrust of the rocket motor, despite the resistance caused the soil barrier 30, ensures a smooth reduction in velocity of the penetrator body 10 until exhaustion of the rocket propellent 24, after which point the velocity is sharply reduced to zero.

The prevention of a dramatic velocity change at the point of impact ensures that the undesirable deceleration forces are counteracted as is evident from the acceleration graph, FIG. 4B. Despite impact with the soil, deceleration achieves only a level of minus 4000 ft/sec$^2$ and the deceleration decreases nearly to zero until the propellent is exhausted. It is only until after the propellant is exhausted that the penetrator body experiences a dramatic deceleration spike. Even that spike, however, is much less than otherwise encountered had not at least some deceleration forces already been absorbed during combustion of the propellent.

The high thrust provided at the point of impact also promotes maximum penetration as is evident from the distance graph, FIG. 4C, where the final penetration distance is shown to be in excess of 300 feet. Such a distance is far greater than would otherwise be obtained from a conventional unthrusted kinetic energy penetrating vehicle.

The graphs of 5A–5C show analogous results for concrete to those of FIGS. 4A–4C for soil. However, in this model, the penetrator body 10 (having the same weight) was given an impact velocity of 2000 ft/sec and the thrust of the rocket motor was increased to 1,750,000 lbs. The burn time lasted between 0.07 and 0.08 seconds. The increased velocity and increased thrust is necessary in order to effect adequate penetration of concrete, a much harder surface barrier than soil.

The velocity graph, FIG. 5A, shows a more dramatic velocity decrease than that found in FIG. 4A for soil, however, the difference is obviously due to the increased strength of concrete over soil. The graph nonetheless shows that the thrust provided by the rocket motor 24 delays the most excessive velocity decline until after the propellent has been exhausted. Therefore, in the same manner as with soil, the thrust counteracts and reduces the deceleration forces that are otherwise applied to the penetrator body 10 at impact.

As shown in FIG. 5B, due to the thrust provided by the rocket motor at impact, a dramatic impact deceleration spike is avoided, and no deceleration spike is encountered until the propellent is exhausted. Moreover, since the penetrator body is continuing to lose velocity even during combustion of the propellent, the deceleration spike that is ultimately encountered is significantly less than would otherwise be endured at impact.

Finally, as with soil, the high thrust provided at the point of impact with concrete also promotes maximum penetration as is evident from the distance graph, FIG. 5C. The final penetration distance is shown to be in excess of 80 feet. Such a distance is far greater than would otherwise be obtained from a conventional thrusted kinetic energy penetrating vehicle.

Figure 6:
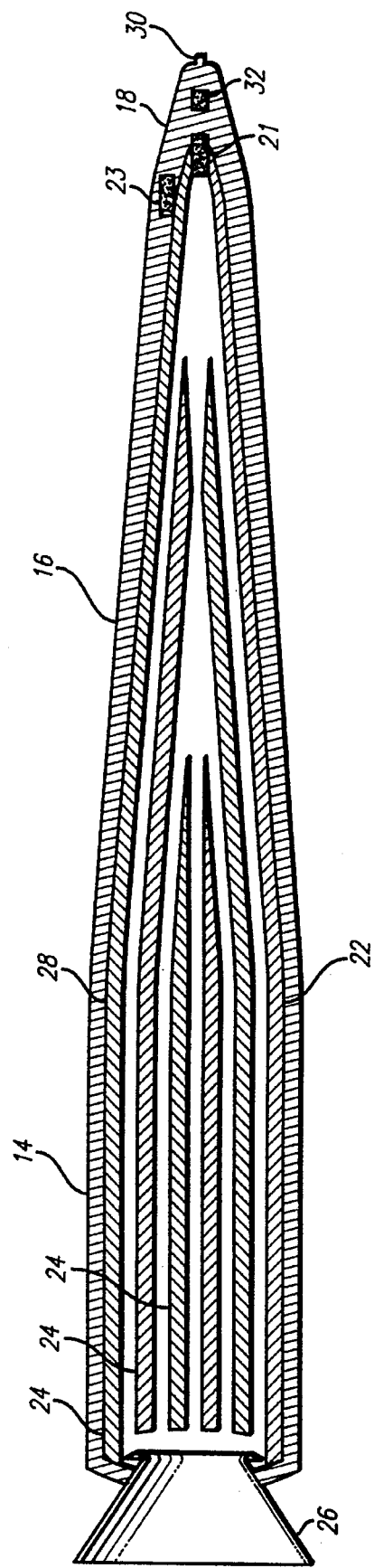
FIG. 6 is a cross-sectional view of a second preferred embodiment of a penetrating vehicle in accordance with the present invention.

In another preferred embodiment of the present invention, the rocket motor 22 is configured to extend into the forward section 16 of the elongated projectile body as shown in FIG. 6. In this embodiment, there is no payload compartment 20 or explosives and the propellant 24 extends from the nose portion 18 all the way to the rear of the elongated body. An ignitor is placed inside the rocket motor 22 within the nose portion 18 of the projectile body and is connected to the fuse 32. A Motor Case Venting Charge (MVC) 23 is disposed near the ignitor 21 within the housing of the elongated projectile body and is also connected to the fuse 32.

This preferred embodiment usually contemplates the use of the Hard Target Smart Fuze (HTSF) as discussed previously. In operation, the fuse 32 first ignites the rocket motor 22 upon impact as previously discussed. After the projectile has traversed the desired distance either through a certain number of walls or a certain number of floors or any other predetermined distance, the fuse 32 will activate the detonator which, in turn, ignites the MVC 23 and causes a rupture in the wall of the forward section 16 of the projectile body. This rupture serves a number of functions. First, the rupture will prevent further progress of the projectile body insofar as the exhaust from the combustion of the propellant 24 will escape through the newly formed rupture and thereby reduce dramatically, if not completely, the thrust emanating from the rocket motor nozzle 26. Second, the exhaust venting through the rupture will prove highly damaging to the target area or room in which the projectile body has come to rest. The temperature and toxicity of the exhaust fumes will prove lethal to any individuals and will likely damage any sensitive target machinery.

Although the present invention is disclosed with reference to specific embodiments, it will be recognized that the specific embodiments are only exemplary of the useful and novel aspects of the present invention. Those skilled in the art will also recognize the many equivalents to the specific embodiments described herein. Consequently, the invention is not to be construed as being limited thereto but only by the proper scope of the following claims.

What is claimed is:

1. A penetrating vehicle comprising:
   an elongated projectile body having a forward section and a rearward section, said forward and rearward sections being permanently connected to each other;
   said forward section having a nose portion in the shape of a truncated cone;
   said forward section including a compartment for housing a projectile payload;
   said rearward section including a rocket motor for causing said projectile body to penetrate and traverse a surface barrier after initial contact of said projectile body with said surface barrier, said rocket motor being secured within said rearward section so as to travel with said projectile body during said penetration;
   said rocket motor including a high energy propellant for providing a high thrust of at least 250,000 lbs, said propellant positioned within said rocket motor to combust with a short burn time no longer than 0.5 seconds;
   an impact fuse disposed in said forward section for igniting said rocket motor within a minimal time lapse after impact of said projectile body with said barrier surface;
   said forward section including a wall separating said payload compartment from said rocket motor in said rearward section; and
   said projectile body having a wall thickness and a diameter that are proportionally related by a ratio Of no less than one to thirty-six.

2. A penetrating vehicle according to claim 1, wherein said propellant in said rocket motor is positioned to substantially maximize the propellant surface area so that a burn time of said propellant is substantially minimized.

3. A penetrating vehicle according to claim 2, wherein said propellant is positioned in a spiral configuration within said rocket motor and extends from said wall substantially along the length of said rocket motor.

4. A penetrating vehicle according to claim 1, wherein said rocket motor includes a nozzle for directing thrust of said rocket motor.

5. A penetrating vehicle according to claim 1, wherein said nose portion includes a nodule protruding from a flat surface of the truncated cone shape of the nose portion.

6. A penetrating vehicle according to claim 1, wherein said forward section follows a conical shape and said rearward section follows a cylindrical shape and wherein said conical shape of said forward section smoothly transitions to the cylindrical shape of said rearward section, and wherein said penetrating vehicle is formed of a high strength steel.

7. A penetrating vehicle comprising:
   an elongated projectile body having a forward section and a rearward section;
   a rocket motor for causing said projectile body to penetrate and traverse a surface barrier following initial contact of said projectile body with said surface barrier;
   said rocket motor including a high energy propellant positioned within said rocket motor for rapid combustion so that said rocket motor provides high thrust to said projectile body that counteracts deceleration forces caused by said initial contact and that promotes a penetration distance of said projectile body into said surface barrier;
   wherein said propellant extends substantially the length of said elongated body from said forward section to said rearward section; and
   a rocket motor case venting charge disposed at a position along the inside wall of said elongated projectile body, said charge being connected to a fuse for detonation at a desired period as sensed by said fuse.

8. A penetrating vehicle according to claim 7, wherein said venting charge is disposed at a position along the inside wall of said forward section of said elongated projectile body.

* * * * *